(12) United States Patent
Feng

(10) Patent No.: US 12,503,351 B2
(45) Date of Patent: Dec. 23, 2025

(54) CARBONATED WATER MACHINE

(71) Applicant: CARBON8WATER, INC., Dover, DE (US)

(72) Inventor: Yao Feng, Lake Worth, FL (US)

(73) Assignee: CARBON8WATER, INC., Dover, DE (US)

( * ) Notice: Subject to any disclaimer, the term of this patent is extended or adjusted under 35 U.S.C. 154(b) by 947 days.

(21) Appl. No.: 17/700,788

(22) Filed: Mar. 22, 2022

(65) Prior Publication Data

US 2023/0303378 A1    Sep. 28, 2023

(51) Int. Cl.
  *B67D 1/00*    (2006.01)
(52) U.S. Cl.
  CPC ........... *B67D 1/0058* (2013.01); *B67D 1/007* (2013.01)
(58) Field of Classification Search
  None
  See application file for complete search history.

(56) References Cited

U.S. PATENT DOCUMENTS

| | | |
|---|---|---|
| 2004/0124548 A1 | 7/2004 | Rona et al. |
| 2012/0038068 A1 | 2/2012 | Bormes et al. |
| 2016/0106136 A1 | 4/2016 | Gordon et al. |
| 2018/0057338 A1* | 3/2018 | Baysal ............... B01F 35/7176 |
| 2019/0344225 A1* | 11/2019 | Van De Sluis ..... B01F 23/2362 |
| 2021/0094004 A1 | 4/2021 | Humphrey .......... B01F 35/7172 |
| 2023/0065625 A1* | 3/2023 | Mills ................... B67D 1/0046 |
| 2023/0108775 A1* | 4/2023 | Abeygunawardana ..................... B67D 1/0058 222/64 |

OTHER PUBLICATIONS

International Search Report and Written Opinion issued in counterpart PCT Application No. PCT/US2002/021248, dated Jun. 9, 2022.

* cited by examiner

*Primary Examiner* — Elizabeth M Kerr
(74) *Attorney, Agent, or Firm* — Westbridge IP LLC

(57) ABSTRACT

Disclosed is a carbonated water machine, including a base, a mixer, a liquid supply assembly and a gas supply assembly. The base comprises a main body and an extension part, the main body is formed with a mounting cavity, the extension part is extended outward from a side wall of the main body and provided with a flow outlet, an internal space of the extension part is intersected with the mounting cavity; the mixer is arranged in the mounting cavity and formed with a mixing chamber, a gas-liquid inlet and an output port communicating with the mixing chamber, and the output port is communicated with the flow outlet; the liquid supply assembly is arranged in the mounting cavity and has a liquid outlet communicating with the gas-liquid inlet; and the gas supply assembly is disposed in the mounting cavity and has a gas outlet communicating with the gas-liquid inlet.

9 Claims, 9 Drawing Sheets

CARBONATED WATER MACHINE

TECHNICAL FIELD

The present application relates to the technical field of gas-liquid mixing, in particular to a carbonated water machine.

BACKGROUND

Carbonated water is a common and popular beverage, which is mainly made by dissolving a large amount of carbon dioxide in water. In the related art, carbonated water is mostly produced by mixing in pressure tanks. It is necessary to inject carbon dioxide or liquid with a preset pressure into the pressure tank in advance, and then inject high-pressure liquid or carbon dioxide into the carbonated water mixing device to dissolve carbon dioxide in the liquid by high-pressure impact. This manufacturing method has higher requirements on the strength of the pressure tank, the pressure relief method and the liquid level height in the pressure tank, and improper operation has the risk of explosion. The operation steps are complicated and the use is not convenient enough.

SUMMARY

The main purpose of the present application is to provide a carbonated water machine, which aims to provide a carbonated water machine with convenient operation and safety.

To realize the purpose above, the present application provides a carbonated water machine, the carbonated water machine includes:

- a base, where the base comprises a main body and an extension part, the main body is formed with a mounting cavity, the extension part is extended outward from a side wall of the main body, and an internal space of the extension part is intersected with the mounting cavity, the extension part is provided with a flow outlet;
- a mixer, where the mixer is arranged in the mounting cavity, the mixer is formed with a mixing chamber, the mixer is opened with a gas-liquid inlet and an output port communicating with the mixing chamber, and the output port is communicated with the flow outlet;
- a liquid supply assembly, where the liquid supply assembly is arranged in the mounting cavity, and a liquid outlet of the liquid supply assembly is in communication with the gas-liquid inlet; and
- a gas supply assembly, where the gas supply assembly is disposed in the mounting cavity, and a gas outlet of the gas supply assembly is in communication with the gas-liquid inlet.

Optionally, the liquid supply assembly includes:
a water tank; and
a water pump, where the water pump has a water pumping port in communication with the water tank, and a water outlet of the water pump is in communication with the gas-liquid inlet.

Optionally, a limit port connected to the mounting cavity is opened on one side of the main body away from the extension part, and a water tank bracket is provided in the mounting cavity and arranged towards the limit port, the water tank is clamped on the water tank bracket, and a part of the water tank is located outside the limit port;

and/or, the water tank is arranged above the water pump.

Optionally, the gas supply assembly includes:
a gas cylinder, where the gas cylinder is vertically disposed in the mounting cavity;
a gas cylinder connector, where the gas cylinder connector covers a valve arranged on a top of the gas cylinder, and the gas cylinder connector is provided with the gas outlet; and,
an ejector mechanism, where the ejector mechanism is arranged above the gas cylinder connector, and an ejector rod of the ejector mechanism is telescopically arranged, and one end of the ejector rod is configured though the gas cylinder connector and abutted against the valve of the gas cylinder to open and close the valve during an extension and retraction process.

Optionally, the base further comprises a gas cylinder bracket arranged in the mounting cavity and formed with a limiting space, and the gas cylinder is limited in the limiting space.

Optionally, a side wall of the main body is provided with a mounting port communicating with the mounting cavity, the mounting port is arranged toward the gas cylinder, the base further comprises a side cover plate arranged at the mounting port.

Optionally, a pressure regulating valve is provided between the gas outlet and the gas-liquid inlet;
and/or, a one-way valve is provided between the gas outlet and the gas-liquid inlet.

Optionally, the carbonated water machine further includes a bubbler arranged at the flow outlet.

Optionally, the carbonated water machine further comprises a water receiving tray arranged below the outlet and spaced apart from the flow outlet.

Optionally, an impact interface is formed in the mixer, and the gas-liquid inlet is configured for gas-liquid mixture to enter the mixing chamber and impact on the impact interface.

The gas-liquid mixing method adopted by the carbonated water machine of the present application is to inject liquid and carbon dioxide from the gas-liquid inlet of the mixer into the mixing chamber of the mixer at the same time by the liquid supply assembly and the gas supply assembly, so as to form carbonated water in the mixing chamber by gas-liquid mixing, and then the carbonated water flows out from the carbonated water machine for the user to drink through the output and the flow outlet. The technical scheme of the present application completely eliminates the pressure tank, and adopts an instant mixing method. The user can directly take carbonated water at the flow outlet of the carbonated water machine without other operations, and there is no need to impact the liquid or carbon dioxide with high pressure in the pressure tank, in which the water level and air pressure are strictly controlled, the convenience and safety of the use of the carbonated water machine is improved.

BRIEF DESCRIPTION OF THE DRAWINGS

In order to more clearly explain that embodiment of the application or the technical proposal in the related art, the drawings required in the description of embodiments or related art will be briefly described below. It will be apparent that the drawings described below are only some embodiments of the present application, and other drawings may be obtained from the structure shown in these drawings without any creative effort by those of ordinary skill in the art.

Figure 1:
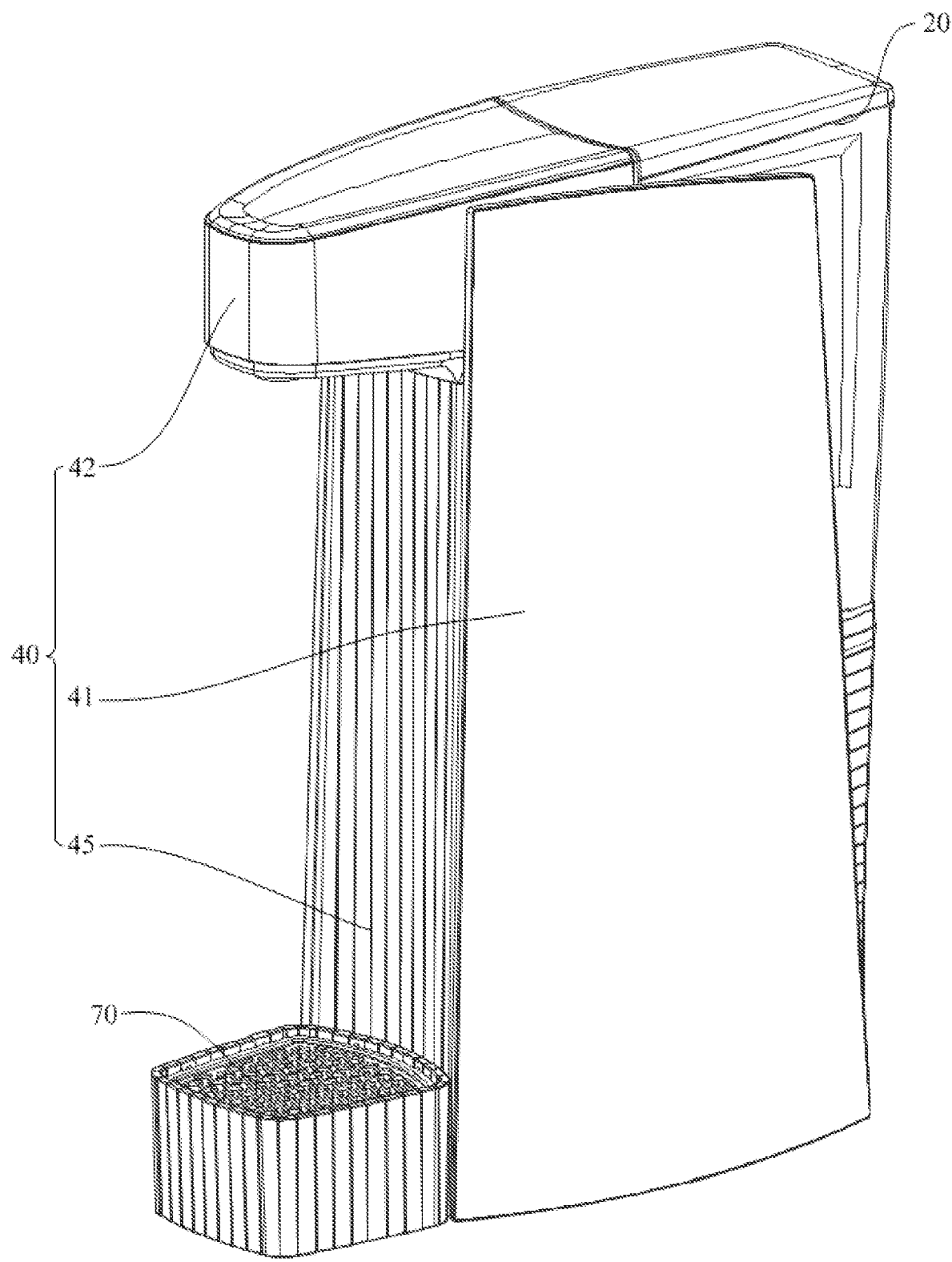
FIG. 1 is a structural view of an embodiment of a carbonated water machine of the present application.

The realization, functional characteristics and advantages of the object of the present application will be further described with reference to the drawings in conjunction with the embodiments.

DETAILED DESCRIPTION OF THE EMBODIMENTS

A clear and complete description of the technical aspects of the embodiments of the application will be given below in conjunction with the accompanying drawings in the embodiments of the application, and it will be apparent that the described embodiments are only part of the embodiments of the application, not all of them. Based on the embodiments in the present application all other embodiments obtained without creative effort by those of ordinary skill in the art fall within the scope of protection of the present application.

It should be noted that all directional indications (such as up, down, left, right, front, back, etc.) in the embodiments of the present application are only used to explain the relative positional relationship, movement situation, etc. between components under a specific posture (as shown in the drawings), and if the specific posture changes, the directional indication also changes accordingly.

In the present application, unless otherwise explicitly specified and defined, the terms "connection", "fixed", etc. should be understood in a broad sense. For example, "fixed" can be a fixed connection, a detachable connection, or being integrated to be one; It can be a mechanical connection or an electrical connection; it can be directly connected or indirectly connected through an intermediate medium, it can be the internal communication of the two elements or the interaction relationship between the two elements, unless otherwise clearly defined. For those of ordinary skill in the art, the specific meaning of the above terms in the present application can be understood according to specific circumstances.

In addition, the description in the present application as to "first", "second" and the like is for descriptive purposes only and cannot be understood as indicating or implying the relative importance thereof or implying the number of technical features indicated. Therefore, the features defined with "first" and "second" can explicitly or implicitly include at least one of the features. In addition, the technical solutions in the various embodiments may be combined with each other, but must be on the basis that the person of ordinary skill in the art can realize it. When the combination of technical solutions conflicts or cannot be realized, it should be considered that the combination of technical solutions does not exist and is not within the scope of protection claimed by the present application.

Carbonated water is a common and popular beverage, which is mainly made by dissolving a large amount of carbon dioxide in water. In the related art, carbonated water is produced by mixing in a pressure tank. It is necessary to inject carbon dioxide or liquid with a preset pressure into the pressure tank in advance, and then inject high-pressure liquid or carbon dioxide at the carbonated water mixing device to dissolve carbon dioxide in the liquid by high-pressure impact. This production method has higher requirements on a strength of the pressure tank and the pressure relief method, it is also necessary to make the liquid level in the pressure tank reach the position of the carbon dioxide injection pipe, and improper operation may lead to the risk of explosion. The operation steps are complicated and the use is not convenient enough.

The present application provides a carbonated water machine 100, which can improve the use convenience and safety of the carbonated water machine 100.

Figure 2:
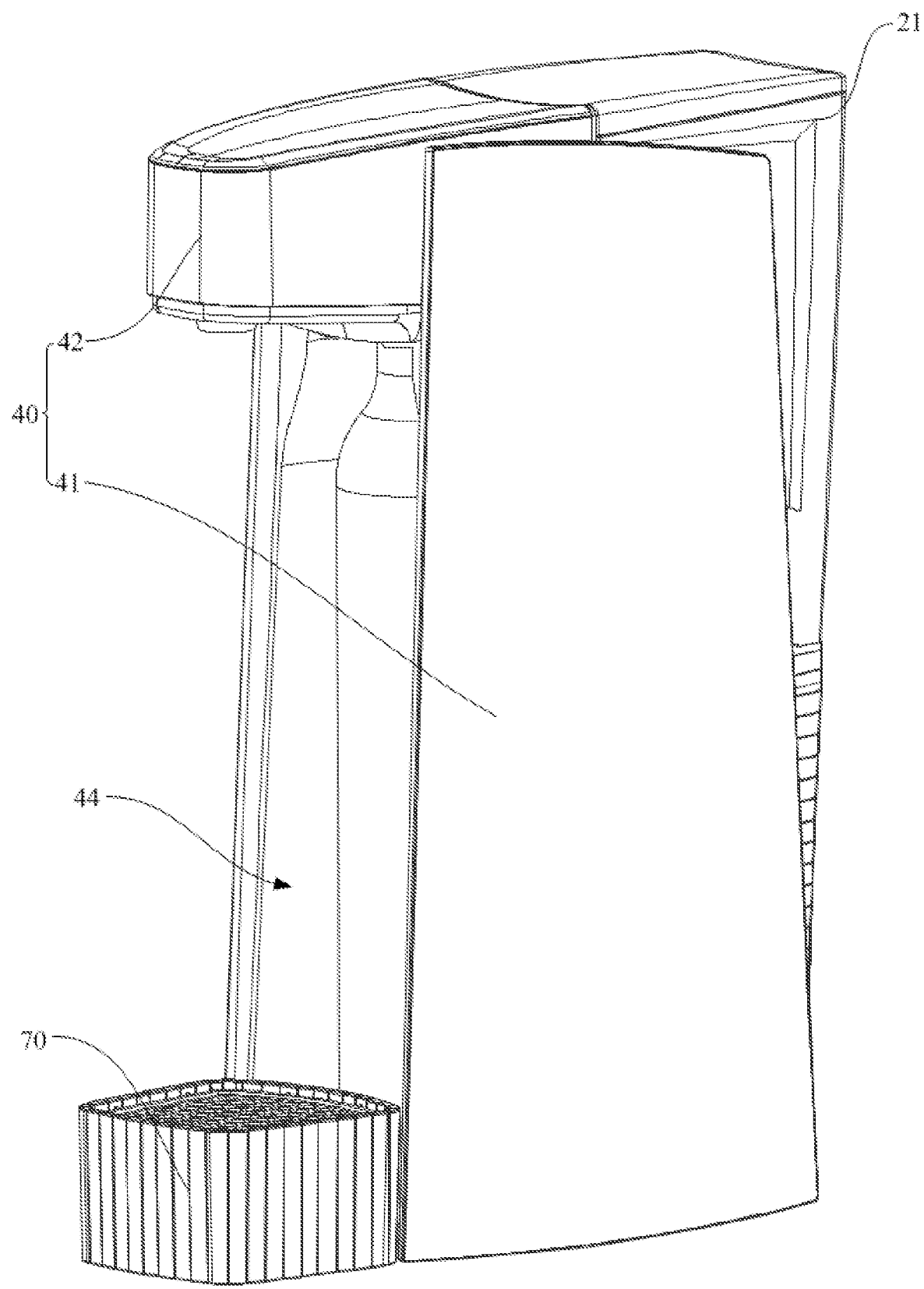
FIG. 2 is a structural view of the carbonated water machine of the present application, with the side cover plate removed.
Figure 3:
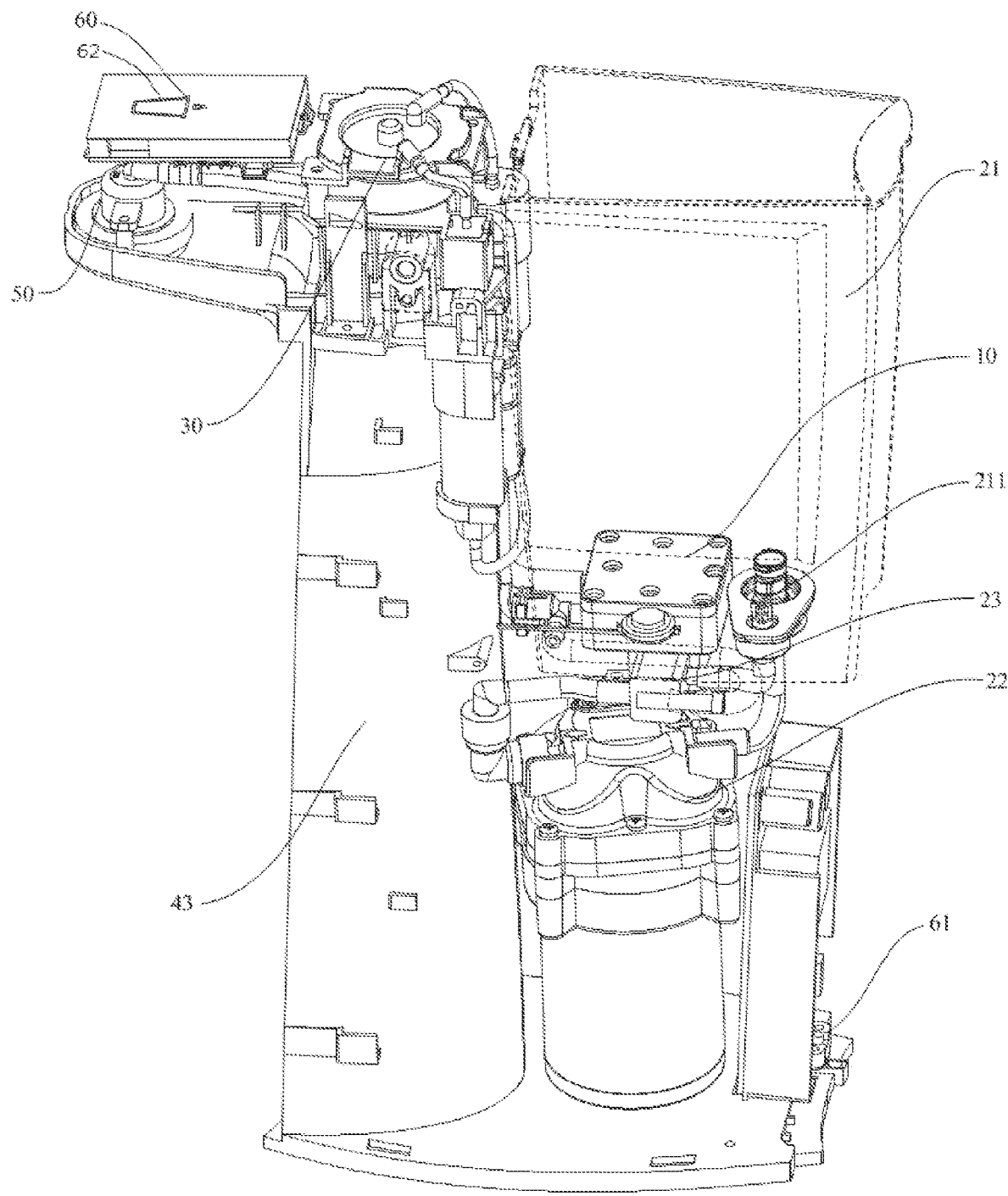
FIG. 3 is a structural view of an embodiment of the carbonated water machine of the present application.

Please refer to FIGS. 1 to 3, in some embodiments of the carbonated water machine 100 of the present application, the carbonated water machine 100 includes:

a base 40, the base 40 including a main body 41 and an extension part 42, the main body 41 being formed with a mounting cavity 44, the extension part 42 extending outward from the side wall of the main body 41, and the internal space of the extension part 42 being communicated with the mounting cavity 44, and a bottom wall of the extension part 42 being provided with a flow outlet;

a mixer 10, the mixer 10 being located in the mounting cavity 44, the mixer 10 being formed with a mixing chamber 113, a gas-liquid inlet 1111 and an output port 1112 communicating with the mixing chamber 113, the output port 1112 being communicating with the flow outlet;

a liquid supply assembly 20, the liquid supply assembly 20 being arranged in the mounting cavity 44, and a liquid outlet of the liquid supply assembly 20 being in communication with the gas-liquid inlet 1111; and a gas supply assembly 30 disposed in the mounting cavity 44, and a gas outlet 321 of the gas supply assembly 30 being in communication with the gas-liquid inlet 1111.

The carbonated water machine 100 proposed in this application is configured to dissolve carbon dioxide in water to prepare carbonated water. The carbonated water machine 100 includes a base 40 as a basis for installation, and a liquid supply assembly 20, a gas supply assembly 30 and a mixer 10 for mixing gas and liquid are arranged on the base 40, the liquid supply assembly 20 and the gas supply assembly 30 are communicated with the gas and liquid inlet 1111 of the mixer 10, in order to inject water and carbon dioxide into the mixing chamber 113 of the mixer 10 at the same time, so that the water and carbon dioxide can be fully contacted in the mixing chamber 113, and a contact area of the water and carbon dioxide is increased. The mixing method of water and gas in the mixing chamber 113 can be that the water and gas enter the mixing chamber 113, and the carbon dioxide and liquid with a pressure of approximately 6-8 kg/cm2 enter the mixing chamber, making the mixing chamber 113 meet the preset pressure to allow water-gas mixing, or also can use the water hammer effect, so that water-gas impact on the impact interface 114 in the mixing chamber 113, so that high pressure is generated at a moment of impact to promote water-gas mixing. The base 40 includes a main body 41 and an extension part 42. A mounting cavity 44 is formed in the main body 41 for installing the liquid supply assembly 20, the gas supply assembly 30 and the mixer 10. The extension part 42 extends outward from a top side wall of the main body 41 and is provided with a flow outlet, the flow outlet is connected with the output port 1112 of the mixer 10, and the carbonated water after the water and gas are mixed directly flows out for the users to drink, the flow outlet can be formed on an outward extending water pipe, which can be pulled to a desired position, and the flow outlet can also be directly opened on a bottom wall of the extension part 42, so that the flow outlet can be arranged downward, which is convenient for the users to accept carbonated water. It should be noted that, in this embodiment, a gas cylinder 31 of the gas supply assembly 30 may be directly disposed in the base 40, or the gas cylinder 31 may be externally disposed, and likewise the water tank 21 of the liquid supply assembly 20 may be placed on the base 40, or an external water source is used, which is not limited herein.

Therefore, it can be understood that the gas-liquid mixing method adopted by the carbonated water machine 100 of the present application is to inject liquid and carbon dioxide from the gas-liquid inlet 1111 of the mixer 10 into the mixing chamber 113 of the mixer 10 at the same time through the liquid supply assembly 20 and the gas supply assembly 30, so as to form carbonated water in the mixing chamber 113, and carbonated water then flow out from the carbonated water machine 100 through the outlet port 1112 and the flow outlet. The technical scheme of the present application completely eliminates a pressure tank, and adopts an instant mixing method. A user can directly take carbonated water at the flow outlet of the carbonated water machine 100 without other operations, and there is no need to impact liquid or carbon dioxide into the pressure tank, in which a water level and an air pressure are strictly controlled, thus convenience of using the carbonated water machine 100 is improved.

In some embodiments, in order to avoid a problem of bacteria breeding caused by liquid residue in the mixer 10, the liquid supply assembly 20 may be closed first when the carbonated water machine 100 is used. At this time, the gas supply assembly 30 still blows air to the mixer 10, and remaining carbonated water in the mixer 10 and pipes may be discharged, so that the water residue in the mixer 10 and the pipeline may be avoided, and the use of the carbonated water machine is cleaner.

It should be noted that the pressure of the carbon dioxide provided by the gas supply assembly 30 and the pressure of the liquid provided by the liquid supply assembly 20 are equal. If the pressure of one of the carbon dioxide and the liquid is much larger than the pressure of the other one, it is possible that the carbon dioxide or liquid backflow phenomenon occurs, or the carbon dioxide or liquid with the lower pressure cannot enter the mixing chamber 113, and the mixer 10 cannot work normally. Of course, in some embodiments, in order to avoid gas-liquid backflow, one-way valves may be added to the carbon dioxide input and the liquid input.

Figure 5:
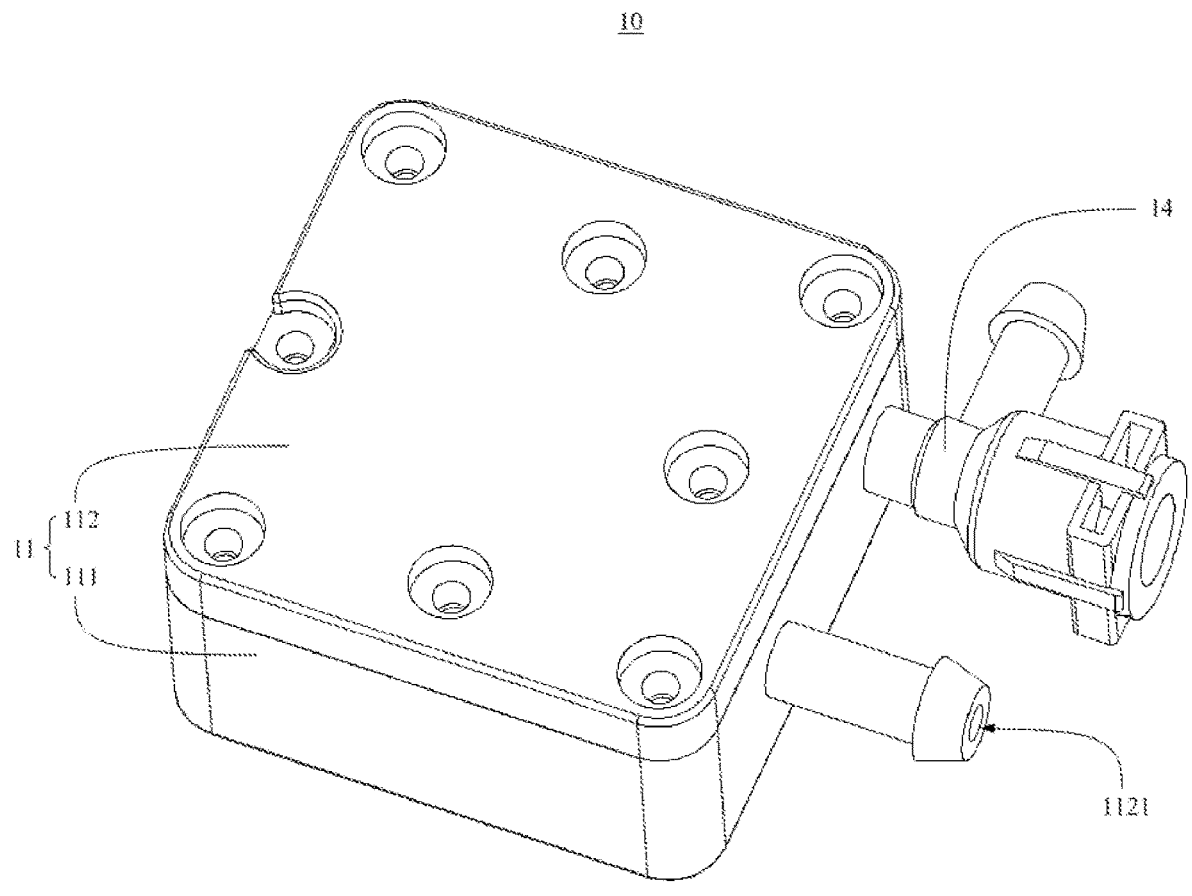
FIG. 5 is a structural view of an embodiment of a mixer of the present application.
Figure 6:
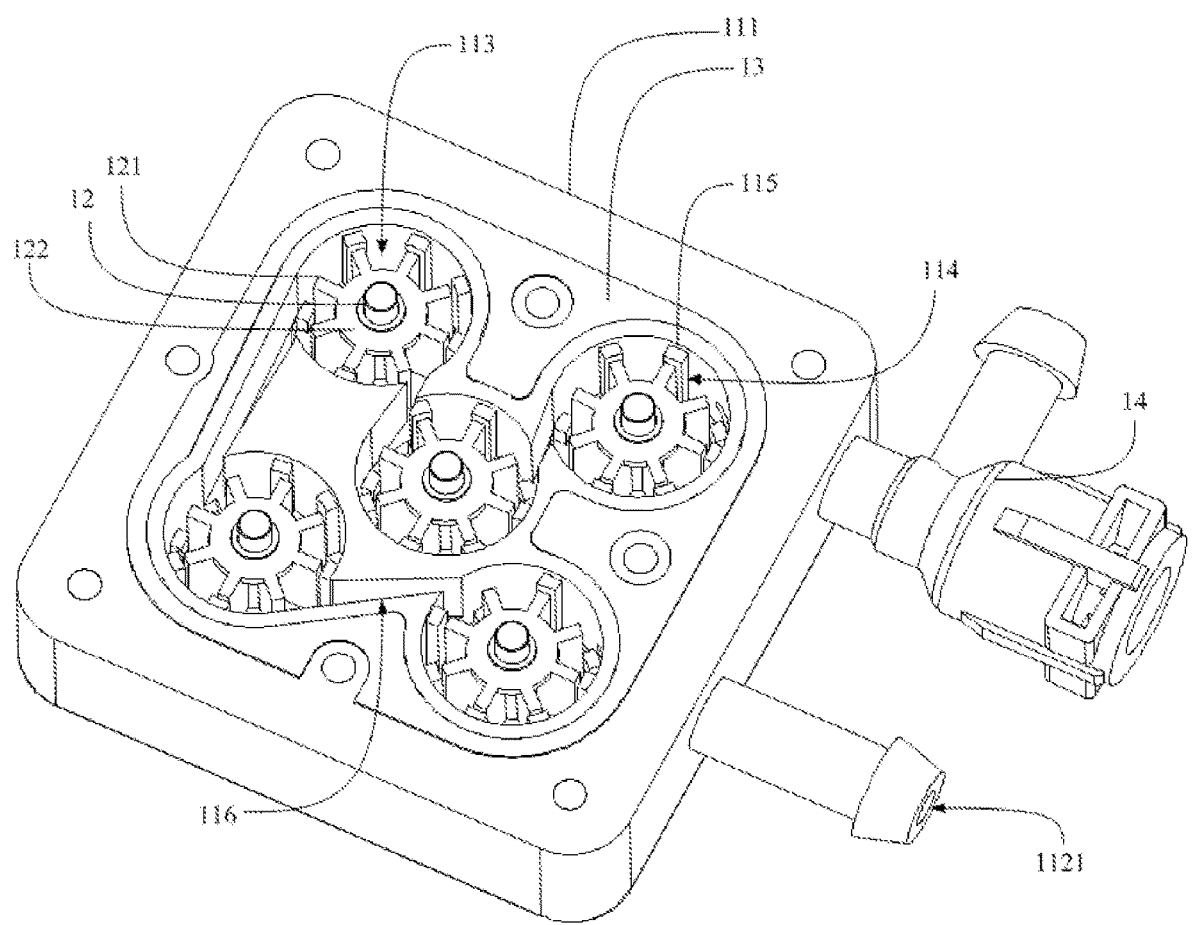
FIG. 6 is the structure view of the mixer, with the cover removed.
Figure 7:
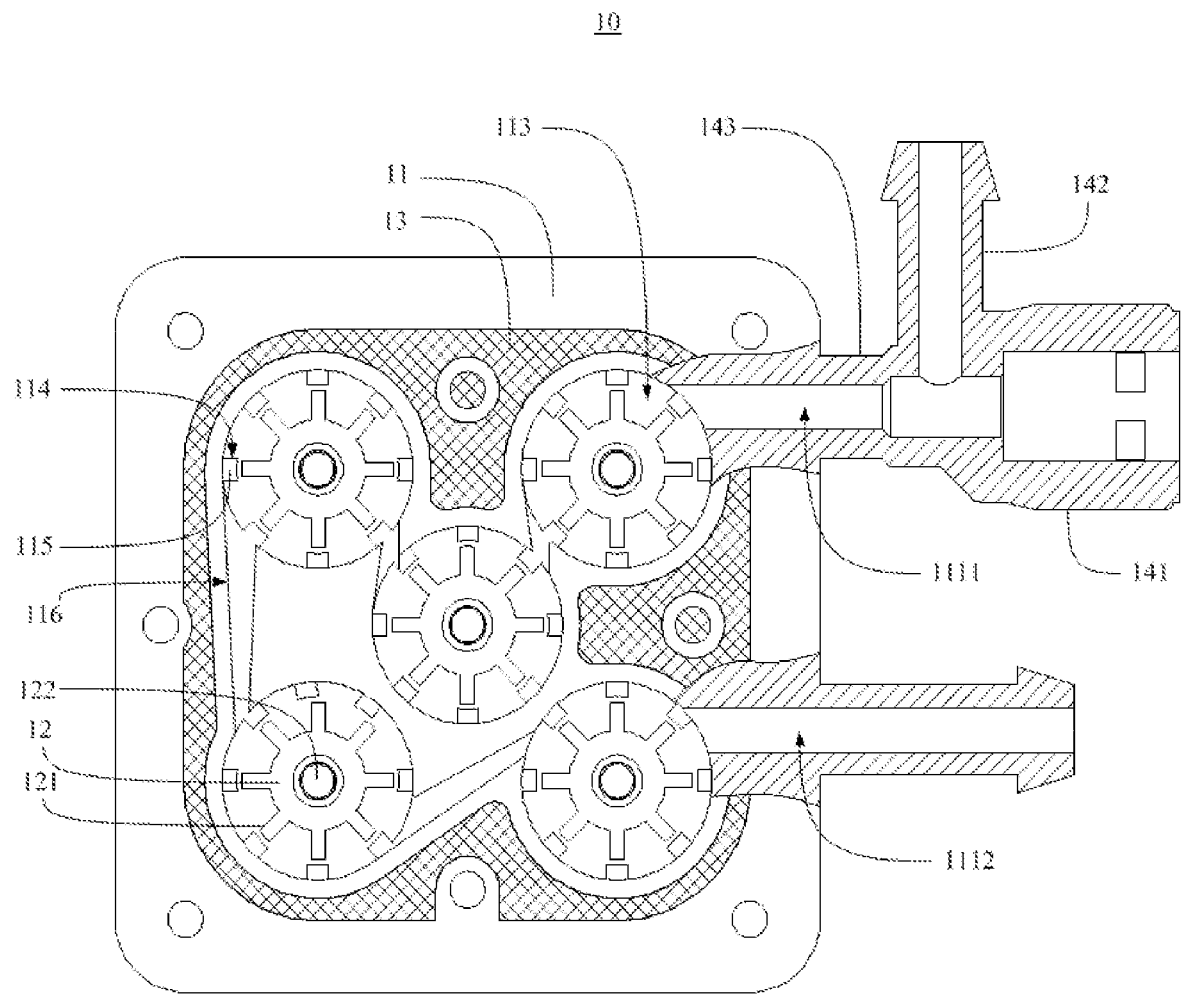
FIG. 7 is a cross-sectional view of the mixer.

According to FIGS. 5 to 7, in some embodiments of the carbonated water machine 100 of the present application, the mixing chamber 113 is formed in the housing 11 of the mixer 10, the housing 11 is provided with the gas-liquid inlet 1111 and the outlet intersecting with the mixing chamber 113, and the mixing chamber 113 is provided with an impact interface 114.

In particular, the gas-liquid mixture can enter the mixing chamber 113 1111 from the gas-liquid inlet and impacts on the impact interface 114.

In this embodiment, the mixing chamber 113 of the mixer 10 is provided with an impact interface 114, and the gas-liquid mixture with a preset pressure is injected into the mixing chamber 113 through the gas-liquid inlet 1111, so that the gas-liquid mixture can collide with the impact interface 114 and stop instantaneously or change the flow direction, so that an instantaneous pressure several times the normal pressure can be generated under the action of inertia, so that carbon dioxide can be better dissolved in the liquid, to obtain carbonated water with high solute concentration. After obtaining carbonated water with high solute concentration, the carbonated water can be discharged out of the mixing chamber 113 through the outlet port 1112.

Specifically, the high-speed moving gas-liquid mixture itself has a certain momentum, so that carbon dioxide and liquid with a pressure of approximately 6-8 kg/cm2 simultaneously impact on the impact interface 114 of the mixing chamber 113, and the impact on the impact interface 114 of the gas-liquid mixture will stop flowing instantly, while other parts of the gas-liquid mixture adjacent to this part of the gas-liquid mixture will still maintain the original state of motion due to inertial action, thus, it is possible to compress the gas-liquid mixture impacting on the part of the impact interface 114, so as to form a high pressure surface with high energy density and very high local pressure at the impact interface 114. As mentioned above, when a flow rate of the fluid moving at high speed in a pressurized pipeline changes sharply, it generates an instantaneous pressure several times the normal pipeline pressure in the pipe wall in a short time due to an effect of inertia, which is called the water hammer effect. This application uses the water hammer effect, through the gas-liquid mixture and impact interface 114 collision, instantly produce a dissolution pressure much higher than the normal pressure, to improve a solubility of carbon dioxide in the liquid, which is based on the momentum theorem.

Specifically, an impulse formula can be:

$$I=Ft$$

a momentum formula can be:

$$p=mV$$

According to the momentum theorem, in a certain time interval, the impulse of the resultant force on the particle is equal to the momentum change of the particle at the same time. From this, the momentum conservation equation can be derived:

$$Ft=mV$$

In the above equation:

I is the impulse of the gas-liquid mixture;
p is the momentum of the gas-liquid mixture;
F is the force of the gas-liquid mixture on the impact interface;
t is the action time between the gas-liquid mixture and the impact interface;
m is the mass of the gas-liquid mixture;
V is the flow rate of the gas-liquid mixture.

It can be seen that when the momentum change of the gas-liquid mixture remains constant, the shorter the action time 114 between the gas-liquid mixture and the impact interface, the greater the force of the gas-liquid mixture on the impact interface 114. Therefore, when the high-speed moving carbon dioxide and liquid collide on the impact interface 114 at the same time, the gas-liquid mixture undergoes a higher momentum change in a short time, and an impact force much higher than the normal pressure is formed on the impact interface 114, thereby, the solubility of carbon dioxide dissolved in liquid at the impact interface 114 is enhanced.

It should be noted that, in this embodiment, the impact interface 114 may be set as a hard surface, specifically, the impact interface 114 may be a cavity wall of the mixing chamber 113, or be that as described in the following embodiments, that is, a rib 115 is protruded on the inner wall of the accommodating cavity 113, and an impact interface 114 is formed on the side wall of the rib 115. The specific implementation manner can be set according to actual needs, which is not limited herein.

According to FIG. 3, in some embodiments of the carbonated water machine 100 of the present application, the liquid supply assembly 20 includes:

a water tank 21 provided with a water outlet 211 communicating with an internal water storage cavity; and a water pump with a pumping port 211 in communication with the water outlet, and a drainage port in communication with the gas-liquid inlet 1111.

In this embodiment, the liquid supply assembly 20 includes a water tank 21, a water pump and a control valve. The water pump is configured to extract water in the water tank 21 and pressurize the water, so that the water meets the preset pressure and enters the mixer 10. The application uses the water hammer effect to promote gas-liquid mixing. It can be understood that the high-speed moving water-gas has kinetic energy, and the movement state of the gas-liquid mixture changes instantly, for example, when the collision between the gas-liquid and the impact interface 114 causes the water and the gas to stop or change a flow direction in an instant, the carbon dioxide and the liquid will convert their own kinetic energy into impulse, and generate a dissolution pressure much higher than the normal pressure in an instant to improve the carbon dioxide solubility in liquid. And when the kinetic energy of the gas-liquid is higher, the solubility at the moment of impact is higher. Therefore, it is necessary to make the liquid have a certain kinetic energy to enter the mixer 10. At this time, the liquid in the water tank 21 can be extracted by the water pump and the kinetic energy is provided to the liquid. A output power of the water pump can be adjusted according to the required liquid flow rate.

According to FIG. 2 and FIG. 3, in some embodiments of the carbonated water machine 100 of the present application, a side of the main body 41 away from the extension part 42 is provided with a limit port communicating with the mounting cavity 44, The mounting cavity 44 is provided with a water tank bracket, the water tank bracket is arranged toward the limit port, and the water tank 21 is stuck in the water tank bracket, and a part of the water tank 21 is located outside the limit port;

and/or, the water tank 21 is arranged above the water pump.

In this embodiment, the side of the main body 41 of the base 40 away from the extension part 42 is provided with a water tank groove for installing the water tank 21. Specifically, the mounting cavity 44 is provided with a water tank bracket for placing the water tank 21, and a limit port communicated to the mounting cavity 44 is opened on the side of the main body 41 away from the extension part 42, the limit port can be opened on at least one of the top and the side of the main body 41, and is arranged toward the water tank bracket. At this time, the water tank 21 can be inserted into the water tank bracket from the limit port to improve the stability of the installation of the water tank 21 in the base 40, and when the water tank 21 is stuck in the water tank bracket, part of the water tank 21 is exposed from the limit port, which is convenient for users to use.

In some embodiments, the water tank 21 includes a tank body and a tank cover that covers an opening at the top of the tank body, and the tank cover protrudes from a top opening of the main body 41, so that the water tank 21 can be supplied with water by opening the tank cover, without repeatedly taking out the water tank 21, thereby improving convenience of use.

In some embodiments, the water tank 21 is disposed above the water pump to make reasonable use of the space in the mounting cavity 44 and reduce the volume of the carbonated water machine 100.

Figure 4:
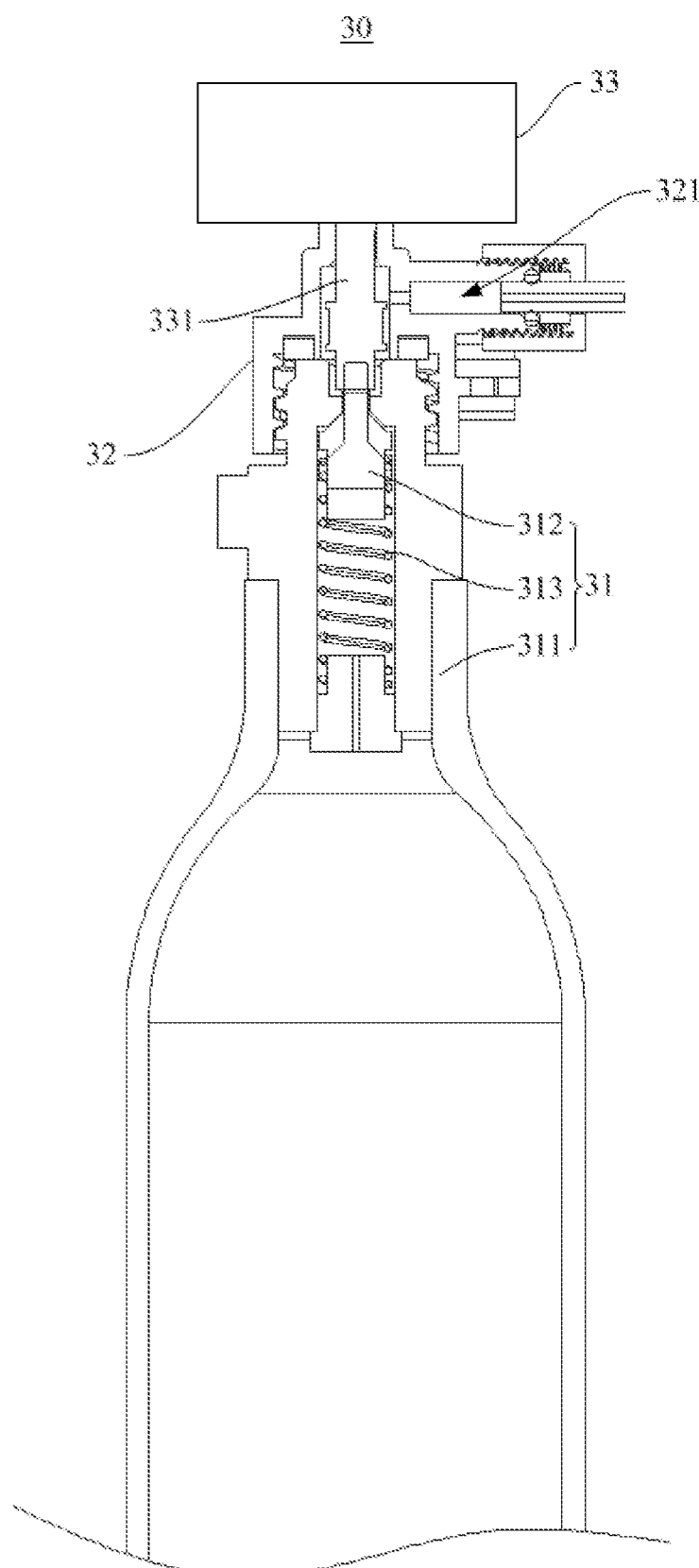
FIG. 4 is a cross-sectional view of a gas cylinder and a pushing-out mechanism of the present application.

According to FIG. 3 and FIG. 4, in some embodiments of the carbonated water machine 100 of the present application, the gas supply assembly 30 includes:

a gas cylinder 31 vertically arranged in the mounting cavity 44;

a gas cylinder connector 32 covering a valve on a top of the gas cylinder 31, and the gas cylinder connector 32 being provided with a gas outlet 321; and an ejector mechanism 33 arranged above the gas cylinder connector 32, an ejector rod 331 of the ejector mechanism 33 being telescopically arranged, and one end of the ejector rod 331 is pierced through the gas cylinder connector 32 and contacts the valve of the gas cylinder 31, so as to open and close the valve during the extension and retraction process.

In this embodiment, the gas supply assembly 30 includes a gas cylinder 31. The gas cylinder 31 includes a cylinder body 311, an opening of the cylinder body 311 is inserted with a movable ejector rod 312 to form a valve, specifically, an outer wall of one end of the movable ejector rod 312 located in the cylinder body 311 is provided with a stopper to close the opening of the cylinder body 311, and a gas outlet gap is provided between a side wall of the movable ejector rod 312 and the opening of the cylinder body 311, the movable ejector rod 312 has a tendency to extend outward by the action of a spring or other reset member 313, so that the stopper closes the opening of the cylinder body 311. When the gas cylinder 31 needs to be opened, the movable ejector rod 312 extends inward to make the stopper away from the cylinder mouth. At this time, the carbon dioxide in the gas cylinder 31 can be discharged outward from the gas outlet gap between the movable ejector rod 312 and the opening. In this embodiment, the gas cylinder 31 further includes a gas cylinder connector 32 and a pushing-out mechanism 33, the gas cylinder connector 32 is approximately in a shape of a cover, the gas cylinder connector 32 is covered at the cylinder mouth of the gas cylinder 31, the gas cylinder connector 32 is approximately provided with a gas outlet 321 for communicating with the mixer 10 at a side of the gas cylinder connector 32, and the ejector rod 331 of the pushing-out mechanism 33 is disposed through the outer end of the gas cylinder connector 32, when the ejector rod 331 of the ejector mechanism 33 is extended, the movable ejector rod 312 can be ejected into the gas cylinder 31 to open the gas cylinder 31, so that carbon dioxide enters the cylinder connector 32 and flows from the gas outlet 321 to the mixer 10. When the ejector rod 331 of the ejector mechanism 33 is retracted, the movable ejector rod 312 can be reset under the action of the spring or other reset member 313 to close the gas cylinder 31. In this embodiment, the ejector mechanism 33 controls a retraction of the ejector rod 331, which may be driven by a cylinder, or may be driven by a motor and a mechanical transmission mechanism, which is not limited here.

According to FIG. 3, in some embodiments of the carbonated water machine 100 of the present application, the base 40 further includes a gas cylinder bracket 43, the gas cylinder bracket 43 is disposed in the mounting cavity 44 and is formed with a limiting space, and the gas cylinder 31 is limited in the limiting space.

In this embodiment, the gas cylinder bracket 43 is arranged in the mounting cavity 44, and the gas cylinder bracket 43 forms a limiting space for limiting the gas cylinder 31, so as to improve the installation stability of the gas cylinder 31. At this time, the gas cylinder connector 32 can be fixedly connected with the gas cylinder bracket 43, and the gas cylinder 31 can be replaced only by disassembling the gas cylinder 31 from the gas cylinder connector 32, without removing the entire gas supply assembly 30. The arrangement of the cylinder holder 43 can also separate the liquid supply assembly 20 and the water supply assembly to avoid interference between the liquid supply assembly 20 and the water supply assembly.

According to FIG. 1 and FIG. 2, in some embodiments of the carbonated water machine 100 of the present application, a side wall of the main body portion 41 is provided with a mounting port communicating with the mounting cavity 44, the mounting port is arranged toward the gas cylinder 31, and the base 40 further includes a side cover plate 45, and the side cover plate 45 is arranged to cover the mounting port.

In this embodiment, a side wall of the main body 41 is provided with a mounting port facing the gas cylinder 31, and the user can disassemble and assemble the gas cylinder 31 from the mounting port to improve the convenience of usage, in order to prevent foreign objects from entering the mounting cavity 44 when the gas cylinder 31 does not need to be disassembled and assembled, the mounting port is covered with a side cover plate 45, so as to close the mounting cavity 44 when the gas cylinder 31 does not need to be disassembled and assembled, improving safety of using the carbonated water machine 100.

In some embodiments of the carbonated water machine 100 of the present application, a pressure regulating valve is further provided between the gas outlet 321 and the gas-liquid inlet 1111.

In this embodiment, a pressure regulating valve is provided between the gas outlet 321 and the gas-liquid inlet 1111, which can adjust the carbon dioxide pressure of the gas supply assembly 30 input to the mixer 10. If the gas pressure overflowing from the gas cylinder 31 exceeds the preset pressure, the pressure regulating valve can be set as a pressure reducing valve to reduce the carbon dioxide pressure, thereby reducing the risk of use.

In some embodiments of the carbonated water machine 100 of the present application, a one-way valve is provided between the gas outlet 321 and the gas-liquid inlet 1111.

It can be understood that if the carbon dioxide pressure input to the input mixer 10 is less than the liquid pressure input to the mixer 10, or the gas outlet 321 of the gas supply assembly 30 is not closed in time, the liquid can be poured back into the gas supply assembly 30. In this embodiment, a one-way valve is arranged between the gas outlet 321 of the gas supply assembly 30 and the gas-liquid inlet 1111 of the mixer 10, it can effectively prevent the mixed carbonated water or the liquid of the liquid supply assembly 20 from entering the gas supply assembly 30 to cause the carbonated water machine 100 to fail.

According to FIG. 1 and FIG. 2, in some embodiments of the carbonated water machine 100 of the present application, the carbonated water machine 100 further includes a water receiving tray, and the water receiving tray is disposed below the outlet and spaced apart from the outlet.

In this embodiment, the base 40 further includes a water receiving tray, the water receiving tray is disposed below the outlet, and is spaced apart from the outlet to form a water receiving space, so that the user's cup or other container can be located below the outlet, and the water receiving tray is disposed to avoid the moisture of the bearing surface on which the carbonated water 100 is placed due to the sprinkling of carbonated water.

Figure 8:
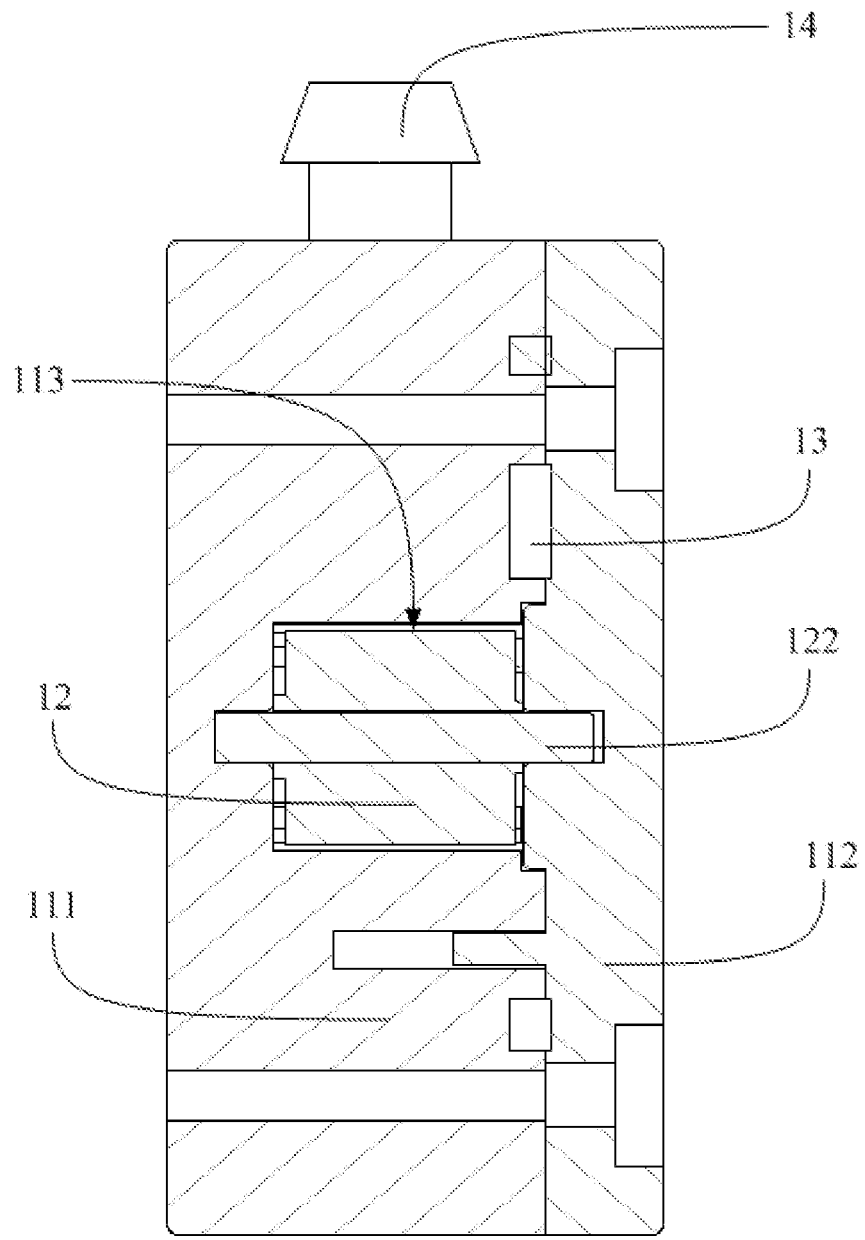
FIG. 8 is a cross-sectional view of the mixer, viewed from another angle.
Figure 9:
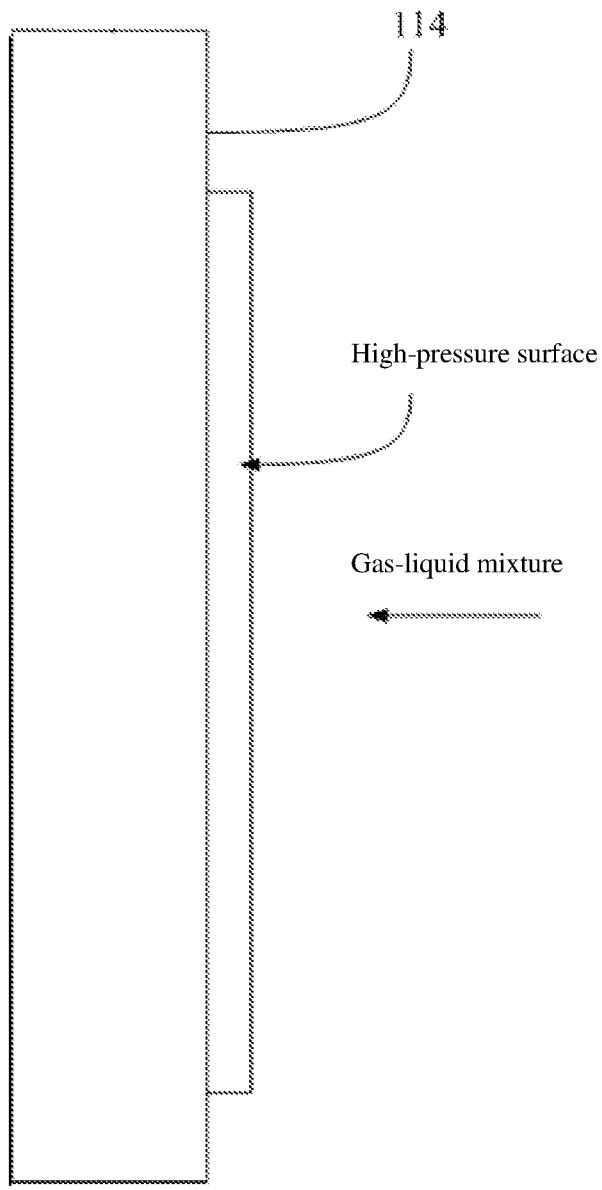
FIG. 9 is a schematic diagram of a water hammer effect of the mixer.

According to FIG. 6 to FIG. 8, in some embodiments of the carbonated water machine 100 of the present application, the mixer 10 further includes an impeller 12, the impeller 12 is rotatably arranged in the mixing chamber 113, the gas-liquid inlet 1111 is arranged facing a circumferential side of the impeller 12, and the impact interface 114 is arranged on an outer side of the impeller 12 and is arranged at intervals from the impeller 12, when the gas-liquid mixture is thrown from the impeller 12, it can impact on the impact interface 114.

In this embodiment, a rotating shaft 122 is arranged in the mixing chamber 113, the impeller 12 is arranged on the rotating shaft 122 and can rotate along the direction of water flow, a plurality of blades 121 are also arranged in the circumferential direction of the impeller 12, and the gas-liquid inlet 1111 is arranged on a circumferential side of the impeller 12 and is arranged facing the blades 121, in addition, the impeller 12 is driven to rotate in a direction of the fluid, thereby the impeller 12 can play a role of separating and equally dividing the gas-liquid mixture, so that the carbon dioxide can be brought into full contact with the liquid, and the dissolution effect of the carbon dioxide can be improved. At the same time, the circumferential side of the impeller 12 is also provided with a plurality of impact interfaces 114, and there is a gap between the impact interface 114 and the impeller 12 to avoid hindering the rotation of the impeller 12. Therefore, when the rotation of the impeller 12 drives the gas-liquid mixture adjacent the impellers 12 to rotate, due to centrifugal action, the gas-liquid mixture can be thrown from the impeller 12 and impact on the impact interface 114 arranged on the circumferential side, using the water hammer effect, a dissolution pressure much higher than the normal pressure can be obtained on the impact interface 114, so that carbon dioxide can be better dissolved in the liquid.

It should be noted that the solubility of carbon dioxide in the liquid mainly depends on the temperature of the water, the pressure of the carbon dioxide and the contact area with the carbon dioxide, due to the different densities of the carbon dioxide and the liquid, the gas-liquid mixture in the mixing chamber 113 is under an action of gravity. It tend to form a stratified configuration, resulting in water and gas stratification, thereby reducing the total contact area between the gas phase and the liquid phase. In this embodiment, the impeller 12 is arranged in the mixing chamber 113. When the impeller 12 rotates, the blades 121 of the impeller 12 can continuously separate and divide the gas-liquid two-phase flow to destroy the water and gas stratification, so as to form a fine dispersion system, so that fine droplets or bubbles are evenly dispersed in the continuous phase, so that the carbon dioxide can fully contact with the liquid and improve the solubility.

According to FIG. 6 and FIG. 7, in some embodiments of the carbonated water machine 100 of the present application, the inner wall of the mixing chamber 113 is protruded with a plurality of ribs 115, the ribs 115 are arranged along the circumferential direction of the impeller 12, and the ribs 115 face the side wall of the impeller 12 to form impact interfaces 114.

In this embodiment, an inner wall of the mixing chamber 113 is convexly provided with a plurality of ribs 115, the ribs 115 are arranged along a circumferential direction of the impeller 12, and are arranged at intervals from the impeller 12, so as to prevent the ribs from 115 obstructing a rotation of the impeller 12. The ribs 115 are formed with an impact interface 114 toward the side wall of the impeller 12. In this way, when a high-speed rotating gas-liquid mixture is thrown, it can directly hit a side of the downstream rib 115, so that the gas-liquid mixture will be impacted and fused many times in the mixing chamber 113, thereby improving the solubility of carbon dioxide in the liquid.

According to FIG. 6 and FIG. 7, in some embodiments of the carbonated water machine 100 of the present application, a plurality of mixing chambers 113 are formed in the housing 11 in sequence, the gas-liquid inlet 1111 communicates with a first mixing chamber 113, the outlet communicates with a last mixing chamber 113, and the impeller 12 and the impact interface 114 are disposed in each mixing chamber 113 are provided with an impeller 12 and the impact interfaces 114.

In this embodiment, a plurality of mixing chambers 113 are formed in a housing 11 in turn, the gas-liquid inlet 1111 is in communication with the first mixing chamber 113 at the head end, and the outlet is in communication with the last mixing chamber 113 at the end, in particular each mixing chamber 113 is provided with an impeller 12 and an impact interface 114 arranged along the circumferential direction of the impeller 12.

It can be understood that, as described in the foregoing embodiment, when the gas-liquid mixture enters the mixing chamber 113, it can drive the impeller 12 in the mixing chamber 113 to rotate in the direction of the water flow. Due to the centrifugal effect, the gas-liquid mixture will be removed from the impeller 12. It is thrown out and impacted on the impact interface 114 arranged on the circumferential side of the impeller 12, and generates an instantaneous pressure several times the normal pressure, thereby improving the solubility, that is, a separate mixing chamber 113 is sufficient to increase the solubility of carbon dioxide, and if a plurality of mixing chambers are connected in series 113, the above process of increasing the solubility of carbon dioxide can be repeated many times for the gas-liquid mixture entering the mixer 10, thereby carbon dioxide can be further dissolved in the liquid to obtain a solution having a high solute concentration.

Further, since each mixing chamber 113 carries out the above-mentioned process of improving the solubility of carbon dioxide, carbon dioxide can be continuously dissolved in the liquid, the volume of fluid in the mixing chamber 113 will be continuously reduced, and the pressure in the mixing chamber 113 will also be reduced. Therefore, when the gas-liquid mixture flows into the multiple mixing chambers, the channel 116 between the mixing chambers 113 has a relatively larger inlet and a relatively smaller outlet. Under certain conditions, because a diameter of the pipe through which the liquid flows becomes smaller and the flow rate increases, according to Bernoulli's principle, the flow rate increases at the outlet where the cross section becomes smaller. It helps to increase the speed of the impeller 12 and the kinetic energy of the impact. Therefore, it improves the solubility of the gas-liquid mixture 113 in a next mixing chamber.

According to FIG. 7, in some embodiments of the carbonated water machine 100 of the present application, an outlet of a channel 116 is arranged toward the impeller 12 at the outlet end of the channel 116.

In this embodiment, the channel 116 between the adjacent mixing chambers 113 is arranged toward the impeller 12 at the outlet end of the channel 116, and is substantially tangent to the impeller 12, so that the gas-liquid mixture in the upper mixing chamber 113 can directly impact on the blade 121 of the next impeller 12 along the channel 116, so as to drive the next impeller 12 to rotate, so that the gas-liquid mixture can be thrown onto the impact interface 114. It can be understood that the channel 116 is arranged tangentially with the two adjacent impellers 12, which can avoid the loss of kinetic energy of the gas-liquid mixture as much as possible, so that the impeller 12 can rotate at a high speed; in this way, the impeller 12 can effectively divide and mix the gas phase and liquid phase in the mixing chamber 113, and the gas-liquid mixture can also produce a larger instantaneous pressure when the collision is pressurized, this achieves a good dissolution of carbon dioxide in the liquid.

Further, according to FIG. 7, in some embodiments of the carbonated water machine 100 of the present application, the cross-sectional area of the channel 116 gradually decreases along a direction of water flow.

In this embodiment, a cross-sectional area of the channel 116 connecting two adjacent mixing chambers 113 gradually decrease along the direction of water flow. When an inner diameter of the channel 116 gradually decreases, the liquid flow rate in the channel 116 will become faster. Therefore, the gas-liquid mixture flowing through the channel 116 has a faster flow rate and impact force, which can maintain movement in the flow direction and further accelerate, therefore, after leaving the channel 116, the gas-liquid mixture can obtain higher kinetic energy, and when impacting on the blades 121 of the impeller 12, the rotation speed of the impeller 12 can be increased. With this arrangement, the impeller 12 can more effectively equally divide and mix the gas phase and the liquid phase in the mixing chamber 113, and the gas-liquid mixture impacting on the impact interface 114 can also instantly cause a greater momentum change, so that the carbon dioxide has a better dissolution effect.

In some embodiments of the carbonated water machine 100 of the present application, the mixer 10 further includes a throttle valve, and the throttle valve is in communication with the outlet.

And/or the outlet is provided as an orifice.

In this embodiment, the mixer 10 has an outlet communicating with the mixing chamber 113, and the solution can flow out from the outlet. If a throttle valve is provided at the outlet and the throttle valve is adjusted to an appropriate opening degree, the solution flow rate discharged from the outlet can be controlled, and the high-pressure chaotic fluid pressurized in the mixer 10 can be converted into a conventional continuous fluid. This arrangement is beneficial to the distribution of the solution flowing out of the outlet by the gas, the pressure at the outlet can also be maintained, and a higher moisture pressure in the mixing chamber 113 can be ensured, thereby further improving the dissolution effect of carbon dioxide. Of course, at this time, the relatively low pressure outside the outlet, such as atmospheric pressure, can also cause pressure accumulated in the mixer 10 to be quickly released through the outlet, thereby improving the safety of the mixer 10.

In an embodiment, the outlet can also be set as an orifice, the flow rate through the orifice can be changed by changing the flow area of the orifice, and the flow area of the orifice can be set according to the parameters of the mixer 10 to control the flow rate of the solution discharged from the outlet. Therefore, the orifice can also have the beneficial effect of setting a throttle valve at the outlet as described in the above embodiment.

According to FIG. 5 and FIG. 7, in some embodiments of the carbonated water machine 100 of the present application, the mixer 10 further includes a three-way joint 14, the three-way joint 14 includes an air inlet joint 141, a liquid inlet joint 142, and a connecting joint 143, and the connecting joint 143 is in communication with the gas-liquid inlet 1111.

In this embodiment, the mixer 10 further includes a three-way joint 14, the three-way joint 14 is arranged outside the mixing chamber 113 and communicates with the mixing chamber 113, the three-way joint 14 includes an air inlet joint 141, a liquid inlet joint 142 and a connecting joint 143, the connecting joint 143 is arranged at the gas-liquid inlet 1111 and communicates with the gas-liquid inlet 1111, carbon dioxide can enter the three-way joint 14 through the air inlet joint 141, the liquid may enter the three-way joint 14 through the liquid inlet joint 142; in this way, a gas-liquid mixture can be formed in the three-way joint 14, and the gas-liquid mixture can enter the mixing chamber 113 through the connecting joint 143.

It should be noted that the carbon dioxide input to the air inlet joint 141 is at equal pressure with the liquid input to the liquid inlet joint 142. For example, carbon dioxide with an output pressure of 6-8 kg/cm can be input to the air inlet joint 141, and liquid with a water pressure of 6-8 kg/cm can be input to the liquid inlet joint 142. If one of the carbon dioxide pressure and the liquid pressure is too high, a backflow of carbon dioxide or liquid may occur in the three-way joint 14, so that the gas-liquid mixture cannot enter the mixing chamber 113 and the mixer 10 cannot operate normally. Of course, in some embodiments, in order to avoid gas-liquid backflow, one-way valves may be added to the carbon dioxide input and the liquid input.

According to FIG. 5, in some embodiments of the carbonated water machine 100 of the present application, the housing 11 includes:

a housing 111, the housing 111 forms an accommodating space with an opening, and the housing 111 is provided with the gas-liquid inlet 1111 and the outlet connecting the accommodating space;

a cover body 112, the cover body 112 covers an opening to form the mixing chamber 113 enclosing with the housing 111.

In this embodiment, the housing 11 includes a housing 111 and a cover 112, a accommodating space is formed in the housing 111, the cover 112 is provided on the housing 111 and enclosed with the housing 111 to form a mixing chamber 113, the housing 111 is also provided with a gas-liquid inlet 1111 and outlet communicating with the mixing chamber 113, and the housing 111 and the cover 112 detachably connected, the mixer 10 further includes an impeller 12, which is arranged in the accommodating space, so that installation of the impeller 12 is advantageous. In particular, the housing 111 may be connected to the cover body 112 by screw thread, and may also be connected to the housing 111 and the cover body 112 by setting fasteners, and the fasteners may be provided as bolts in the following embodiments, which are not described herein.

In an embodiment, the cover 112 and the housing 111 are fixedly connected by bolts, the cover 112 is provided with a counterbore larger than an outer diameter of the bolt, and the end surface of the housing 111 facing the cover 112 is correspondingly provided with a screw hole, and the bolt can be arranged in the counterbore and 111 threaded connection with the housing, thereby locking the cover 112 on the housing 111, in this way, the housing 11 has a stable installation structure, so as to have better stability and reliability.

According to FIG. 7 and FIG. 8, in some embodiments of the carbonated water machine 100 of the present application, the mixer 10 further includes a sealing member 13, which is arranged around a circumference of the opening and is sandwiched between the housing 111 and the cover 112.

In this embodiment, the cover 112 and the housing 111 are enclosed to form a mixing chamber 113, and a sealing member 13 is arranged between the cover 112 and the housing 111, and the sealing member 13 is arranged around an edge of the mixing chamber 113. This arrangement can make that the mixer 10 has better air tightness, avoids air leakage or liquid leakage, and can ensure the pressure in the mixing chamber 113, thereby improving the dissolution effect of carbon dioxide.

In an embodiment, the sealing member 13 is provided with a through hole, and the bolt described in the above embodiment can be connected to the housing 111 through the through hole, so that the sealing member 13 is firmly installed between the housing 111 and the cover 112; in this way, the sealing member 13 can be fixed to improve the position stability of the sealing member 13, and prevent the sealing member 13 from slipping or loosening, thereby ensuring a sealing performance of the mixer 10. In some embodiments, a groove can also be provided on the end face of the housing 111 facing the cover 112, the groove is arranged around the periphery of the mixing chamber 113, and the sealing member 13 is arranged in the groove and abuts against the end face of the cover 112 facing the housing 111. Of course, a groove can also be provided on the cover 112, the sealing member 13 is provided in the groove and abuts against the end face of the housing 111 facing the cover body 112. The specific embodiment can be set according to the actual needs, and is not limited here.

According to FIG. 3, in some embodiments of the carbonated water machine 100 of the present application, the carbonated water machine 100 further includes a bubbler 50, and the bubbler 50 is disposed at the flow outlet.

In this embodiment, the carbonated water machine 100 further includes a bubbler 50 arranged at the flow outlet, and the input port of the bubbler 50 is a wedge-shaped inlet from large to small, so that the mixed carbonated water flows through the bubble. The device receives a certain resistance to play a role of throttling. At the same time, after the carbonated water is buffered by the bubbler 50, a flow rate of the carbonated water can be reduced to obtain the carbonated water with slow flow rate, avoiding greater impact on users when receiving water.

According to FIG. 3, in some embodiments, the carbonated water machine 100 further includes a control system 60, and the control system 60 is electrically connected with the liquid supply assembly 20 and the gas supply assembly 30 to control the operation of the carbonated water machine 100. Generally speaking, the control system 60 includes a main board and a control button 62. The main board is provided with an operating program of the carbonated water machine 100. The control button 62 can be a physical button or a touch button. The user inputs instructions through the control button 62, and the main board controls the corresponding components to perform corresponding actions after analyzing and processing the control instructions.

In some embodiments, the control system 60 further includes a power supply mechanism 61, the power supply mechanism 61 may provide energy for the liquid supply assembly 20 and the gas supply assembly 30, and the power supply assembly may be provided with a battery on the carbonated water machine 100, or may be provided with a power supply interface, which is not limited herein.

The above description is only a preferred embodiment of the present application, and does not limit the patent scope of the present application. Any equivalent structural transformation made by using the description of the present application and the accompanying drawings, or direct/indirect application in other related technical fields under the inventive concept of the present application, is included in the patent protection scope of the present application.

What is claimed is:

1. A carbonated water machine, comprising:
    a base, wherein the base comprises a main body and an extension part, the main body is formed with a mounting cavity, the extension part is extended outward from a side wall of the main body, and an internal space of the extension part is intersected with the mounting cavity, the extension part is provided with a flow outlet;
    a mixer, wherein the mixer is arranged in the mounting cavity, the mixer is formed with a mixing chamber, the mixer is opened with a gas-liquid inlet and an output port communicating with the mixing chamber, and the output port is communicated with the flow outlet;
    a liquid supply assembly, wherein the liquid supply assembly is arranged in the mounting cavity, and a liquid outlet of the liquid supply assembly is in communication with the gas-liquid inlet; and
    a gas supply assembly, wherein the gas supply assembly is disposed in the mounting cavity, and a gas outlet of the gas supply assembly is in communication with the gas-liquid inlet;
    wherein the gas supply assembly comprises a gas cylinder vertically disposed in the mounting cavity, a gas cylinder connector and an ejector mechanism;
    the gas cylinder connector covers a valve arranged on a top of the gas cylinder, and the gas cylinder connector is provided with the gas outlet; and
    the ejector mechanism is arranged above the gas cylinder connector, an ejector rod of the ejector mechanism is telescopically arranged, and one end of the ejector rod is configured though the gas cylinder connector and abutted against the valve of the gas cylinder to open and close the valve during an extension and retraction process.

2. The carbonated water machine according to claim 1, wherein the liquid supply assembly comprises:
    a water tank; and
    a water pump, wherein the water pump has a water pumping port in communication with the water tank, and a water outlet of the water pump is in communication with the gas-liquid inlet.

3. The carbonated water machine according to claim 2, wherein a limit port connected to the mounting cavity is opened on one side of the main body away from the extension part, and a water tank bracket is provided in the mounting cavity and arranged towards the limit port, the water tank is clamped on the water tank bracket, and a part of the water tank is located outside the limit port; and/or
    the water tank is arranged above the water pump.

4. The carbonated water machine according to claim 1, wherein the base further comprises a gas cylinder bracket arranged in the mounting cavity and formed with a limiting space, and the gas cylinder is limited in the limiting space.

5. The carbonated water machine according to claim 1, wherein a side wall of the main body is provided with a mounting port communicating with the mounting cavity, the mounting port is arranged toward the gas cylinder, the base further comprises a side cover plate arranged at the mounting port.

6. The carbonated water machine according to claim 1, wherein a pressure regulating valve is provided between the gas outlet and the gas-liquid inlet; and/or
    a one-way valve is provided between the gas outlet and the gas-liquid inlet.

7. The carbonated water machine according to claim 1, wherein the carbonated water machine further comprises a bubbler arranged at the flow outlet.

8. The carbonated water machine according to claim 1, wherein the carbonated water machine further comprises a water receiving tray arranged below the outlet and spaced apart from the flow outlet.

9. The carbonated water machine according to claim 1, wherein an impact interface is formed in the mixer, and the gas-liquid inlet is configured for gas-liquid mixture to enter the mixing chamber and impact on the impact interface.

* * * * *